United States Patent
Schweizer et al.

(10) Patent No.: US 6,387,026 B1
(45) Date of Patent: May 14, 2002

(54) MACHINE TOOL WITH A TOOL SPINDLE OPERATING FROM BELOW

(75) Inventors: Anton Schweizer, Wurmlingen; Hans-Henning Winkler, Tuttlingen, both of (DE)

(73) Assignee: Chiron-Werke GmbH & Co. KG, Tuttlingen (DE)

( * ) Notice: Subject to any disclaimer, the term of this patent is extended or adjusted under 35 U.S.C. 154(b) by 0 days.

(21) Appl. No.: 09/465,114

(22) Filed: Dec. 16, 1999

(30) Foreign Application Priority Data

Dec. 23, 1998 (DE) .......................... 198 59 662

(51) Int. Cl.[7] .................. B23Q 3/157; B23C 1/06
(52) U.S. Cl. .................. 483/55; 408/234; 409/163; 409/201; 409/211; 409/216; 409/225; 483/31
(58) Field of Search .................. 485/55, 56, 54, 485/31, 14; 409/229, 168, 158, 235, 159, 216, 201, 183, 211, 132, 163, 225; 29/27 R, 27 C; 408/234

(56) References Cited

U.S. PATENT DOCUMENTS

| | | | |
|---|---|---|---|
| 2,989,901 A | * 6/1961 | Bohannon et al. | 409/159 |
| 4,275,777 A | * 6/1981 | Briggs | 29/27 R |
| 4,524,812 A | * 6/1985 | Murphy | 409/183 |
| 4,637,107 A | * 1/1987 | Romeu | 29/27 C |
| 4,712,282 A | * 12/1987 | Romeu | 409/168 X |
| 4,830,554 A | * 5/1989 | Lopez | 409/164 |
| 5,267,818 A | * 12/1993 | Marantette | 409/132 |
| 5,439,431 A | * 8/1995 | Hessbruggen et al. | 483/14 |
| 5,678,291 A | * 10/1997 | Braun | 409/168 X |
| 5,807,044 A | * 9/1998 | Watari et al. | 409/216 X |
| 5,832,783 A | * 11/1998 | Sheldon | 409/235 |
| 5,919,014 A | 7/1999 | Week et al. | |

FOREIGN PATENT DOCUMENTS

| | | | | |
|---|---|---|---|---|
| DE | 307 739 | 10/1920 | | |
| DE | 39 31 075 C2 | 6/1993 | | |
| DE | 196 23 511 A1 | 12/1997 | | |
| JP | 4-13504 | * 1/1992 | | 409/158 |
| JP | 10-86038 | * 4/1998 | | 409/158 |

* cited by examiner

*Primary Examiner*—William Briggs
(74) *Attorney, Agent, or Firm*—Weingarten, Schurgin, Gagnebin & Lebovici LLP

(57) ABSTRACT

A machine tool has a workpiece table for fixing workpieces to be machined and a tool spindle for receiving in a fixture the tools used for machining the workpieces. The machine tool works with an overhead tool pointing upwards in the operating condition.

12 Claims, 2 Drawing Sheets

MACHINE TOOL WITH A TOOL SPINDLE OPERATING FROM BELOW

BACKGROUND OF THE INVENTION

1. Field of the Invention

The present invention relates to a machine tool having a workpiece table for fixing workpieces to be machined, and a tool spindle with a fixture for tools used for machining the workpieces.

2. Related Prior Art

Machine tools of this kind are known from the prior art.

The known machine tools generally have a vertical-axis tool spindle arranged above a workpiece table on which the workpieces to be machined are fixed by clamping means known as fixture.

The tool spindle and the workpiece table are displaceable one relative to the other along three orthogonal axes so that the upside of the workpiece can be machined by a cutting operation in the known way.

During operation, one normally uses a coolant in order to cool the active or operating tool and the workpiece and to carry off the chips produced during the machining operation.

The use of such coolants leads to quite a number of problems. The coolant, which is collected in a chip pan together with the chips produced, must be purified and filtered, an operation that requires extensive handling. During this operation, the coolant evaporates and, due to its aggressive nature, may cause skin problems on the part of the service personnel, so that high disposal costs are connected with the use of coolant, in addition to the before-mentioned extensive handling.

It is known today that depending on the particular workpiece 10 to 25 percent of the production costs are due to the coolant. Aluminium, for example, gets spotty during machining as a result of the use of coolant and must be cleaned upon completion of the operation, and dried in a further step.

All in all, the use of coolant is connected with big problems so that one has tried for some time to operate known machine tools with a system called minimum-quantity lubrication, which as such is known in the art. In the case of such systems using minimum-quantity lubrication only one cubic centimeter of coolant is employed per hour; this can be technically controlled with the aid of novel tool geometries and coatings. However, problems arise in connection with the hot chips.

For, only 10 percent of the heat produced by the machining operation is stored in the workpiece, while the remaining 90 percent is absorbed by the chips produced. The chips fall onto surface areas, for example of carriages, where they lead to thermal deflections. By splashing the hot chips with coolant they are then cooled and, on the other hand, carried off directly into the chip pan.

The chips produced during machining with a minimum-quantity lubrication system or even during dry machining are clearly hotter than in cases where a coolant is used, and lead to clearly greater thermal deflections of the machine tool, that are difficult to control by control engineering means.

The hot chips heat up the machine structure, which leads to the before-mentioned accuracy problems but may also result in functional problems if the chips settle on the workpiece or parts of the machine. If such chips remain deposited on the guides of the carriages, they may be pressed into the guides during movement of the carriage and may damage the guides to an extent that the dimensional accuracy during displacement of the carriage may be impaired.

SUMMARY OF THE INVENTION

In view of the above it is an object of the present invention to reduce the before-mentioned problems connected with the chips in a machine tool of the kind mentioned at the outset by simple constructional means.

This object is achieved with a machine tool of the kind mentioned at the outset in that the machine tool uses an overhead tool pointing upwards when in its operating condition.

The object underlying the present invention is achieved in this way.

For, the inventors of the present invention have realized that by dropping the conventional machine concept and choosing an "overhead machining system", the chips are permitted to fall freely so that they can no longer deposit on the workpiece or the workpiece table and/or the latter's guides, but can be carried off directly into the chip pan.

This novel machine concept now also permits dry machining or machining with minimum-quantity lubrication, the coolant being no longer required to carry off the chips produced. And since the hot chips can no longer deposit on the workpiece or in the area of the workpiece table, no thermal deflections will occur in this area either, so that the cooling effect of the coolant is also no longer required to the same extent as before.

To say it in other words: Due to the "overhead machining system" the novel concept of the machine tool allows dry machining or machining with minimum-quantity lubrication, without the problems encountered in the prior art in connection with dry machining and/or minimum-quantity lubrication having the same disadvantageous effects. Due to the small quantity of coolant used the chips are no longer wetted with coolant so that they cannot stick to the—preferably vertical—structures of the new machine tool as they drop down "from the workpiece". Rather, the dry chips drop directly into the chip pan, guided by suitable baffles. The chip pan, however, is heated up by the very hot chips to a much higher degree than in the case of the before-mentioned machine tool. The temperatures encountered in this connection can be controlled, for example, by insulating the chip pan thermally from the hot chips, whereby thermal deflections of the machine tool as such can be avoided.

According to a further improvement it is preferred if the tool spindle, with its tool-holding fixture pointing upwards, is seated on a mechanical translation system which is arranged, at least in part, below the workpiece table and which preferably comprises at least one lever mechanism mounted on a machine frame of the machine tool so that it can pivot about a vertical axis formed by a joint.

This feature on the one hand provides the advantage that the novel machine tool offers very high machining accuracy due to the fact that the spindle is arranged in the direct neighborhood of the mechanical translation system, below the workpiece table so that no cantilevers or the like are required. This, by first approximation, increases of course the risk that chips may get stuck on parts of the mechanical translation system. However, by designing the mechanical translation system as lever mechanism this risk is again clearly minimized as the mechanical translation system does not comprise any complex guides and carriages that extend along the three orthogonal axes one relative to the other; the movement of the tool spindle is effected through a pure lever mechanism, at least in the plane of the workpiece table, so that there remain only little surfaces of attack for the chips falling to the bottom.

It is preferred in this case if the lever mechanism comprises two vertically oriented plates that can be pivoted about the joint one relative to the other, one of the plates being connected with the tool spindle, the other one with the machine frame.

This feature initially provides constructional advantages, with respect to the machining accuracy, since the plates of the lever mechanism provide a very stiff mechanical translation system so that the tool spindle can be seated directly on the machine frame, via the lever mechanism, in considerably overhanging arrangement below and/or behind the workpiece table. It is preferred in this connection if two lever mechanisms are provided which are again mounted on the machine frame in vertically displaceable arrangement. One achieves in this way on the one hand very good stiffness and safety against tilting, while on the other hand the vertically extending guide offers only small surfaces of attack on which the chips produced may settle.

It is generally preferred if the joints are provided with caps to protect them from chips and if, preferably, the plates comprise chip-repellent surfaces on their upper narrow sides.

This feature also ensures, in a constructionally simple way, that the chips produced will not settle on the surfaces of the mechanical translation system, but will be effectively carried off into the chip pan without any additional aids. Although there remains a risk in the case of long chips that these may settle on the upper narrow sides of the plates of the lever mechanisms, the production of long chips can, however, be avoided by the use of a suitable tool geometry, as is generally known in the art.

It is generally preferred if the workpiece table comprises a device for fixing the workpieces, which is accessible from below, and preferably two horizontal and parallel supports, on which the device is arranged for pivotal movement about a horizontal axis.

This feature provides the advantage that the workpiece table is sort of open towards the bottom, in the area of the device, so that the free fall of the chips is not obstructed in any way. On the other hand, however, it also allows comfortable operation of the novel machine tool, as for changing the workpiece the device, which may be designed in the form of a cradle plate, only has to be pivoted by 180° about the horizontal axis so that the finished workpiece comes to lie on top of the workpiece table. The operator can now remove the workpiece, and mount a new workpiece, without any difficulty.

One recognizes in this connection a big additional advantage of the new machine tool insofar as the operators are no longer hindered by the spindle when carrying out the work necessary for the workpiece change, since the spindle is now located beneath the workpiece table and no longer—as was usual heretofore—above the workpiece table. The novel machine tool therefore no longer presents the risk of injury, for example by hot chips, that may drop from the tool spindle later.

An additional advantage of the novel machine tool lies in the fact that it has a notably lower height because the space above the workpiece table heretofore used by the mechanical translation system of the tool spindle is no longer needed, the mechanical translation system being now accommodated in the previously unused space beneath the workpiece table.

The novel machine tool is, thus, clearly compacter than known machine tools.

It is then preferred in this case if a chip baffle, extending obliquely in downward and forward direction, is arranged between the supports, with a chip collector funnel preferably arranged below the mechanical translation system for transferring any chips encountered into a chip pan.

The chip baffle and the chip collector funnel ensure very efficiently that the chips produced during the machining of workpieces are directed immediately into the chip pan, whereby the chips are prevented from penetrating into exposed parts of the mechanical translation system. This is so because due to its forward and downward inclination the chip baffle comes to lie between the upper end of the vertical guides and carriages, on which the lever mechanisms are displaced vertically, and the workpiece, i.e. the source of the chips encountered.

It is further generally preferred if a tool magazine with storage positions for tools is arranged on the machine frame and if the different storage positions can be directly addressed by the tool spindle for tool changes.

To provide a tool magazine in the working area of a machine tool has been known before, but as a rule tool changes are effected by additional tool changers that are equipped with grippers and swinging arms and capable of changing tools between the tool magazine and the tool-holding fixture of the spindle. The tool magazine is arranged in this case clearly above the workpiece table in order to prevent soiling of the available tools by chips flying around or by splashing coolant. The tool changer is required in this case for removing the tools from above and for inserting them into the spindle from below.

However, due to the "overhead arrangement" it is now possible for the tool spindle to address the individual storage positions of the tool magazine directly. The tool magazine may be arranged in this case above the plane of the workpiece table so that soiling of the available tools is prevented.

Consequently, the novel machine concept additionally makes it possible to do without the tool changers, without sacrificing the advantage provided by them according to the prior art, namely that the tools are not soiled in their storage positions.

Further advantages are evident from the description below of the appended drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

One embodiment of the invention is shown in the drawings and will be described hereinafter with reference to the drawings, in which.

DESCRIPTION OF A PREFERRED EMBODIMENT

Figure 1:
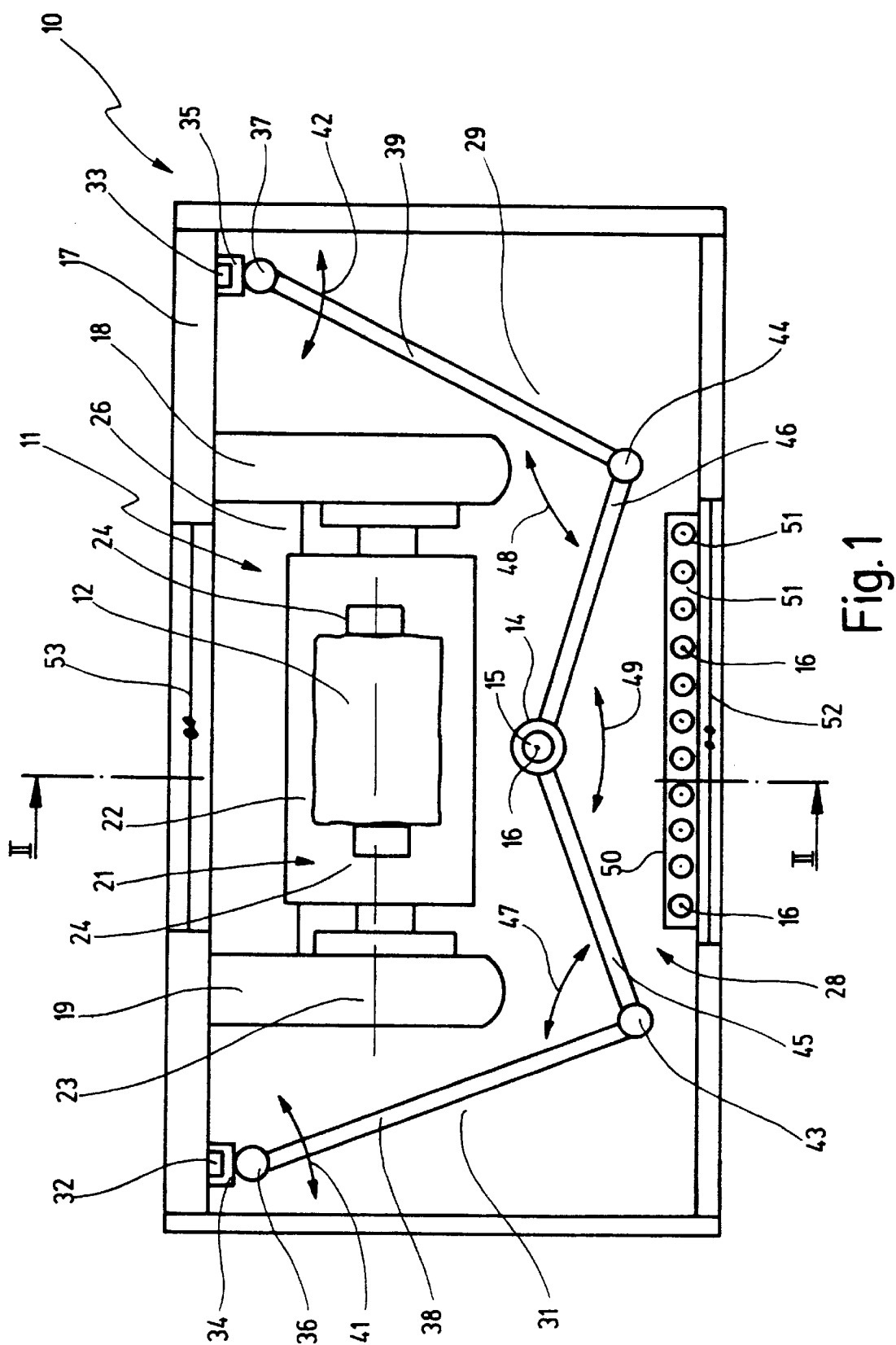
FIG. 1 shows a top view of the novel machine tool.

In the top view of FIG. 1, a machine tool is indicated generally by reference numeral 10. The machine tool 10 comprises a workpiece table 11 on which a workpiece 12, still to be machined, is fixed in a manner to be described later.

There is further provided a tool spindle 14 with an overhead tool 16 arranged in the spindle's upwardly pointing tool holding fixture 15 for machining of the workpiece 12.

The machine tool 10 further comprises, as known as such, a machine frame 17 on which both the workpiece table 11 and the tool spindle 14 are mounted in a fashion to be described later.

The workpiece table 11 comprises two horizontal and mutually parallel supports 18, 19 fixed directly on the machine frame 17.

Between the supports 18, 19 there can be seen a device 21 for fixing the workpiece 12 to be machined. The device 21 comprises a cradle plate 22 that can be pivoted about a horizontal axis indicated at 23. In the position illustrated in FIG. 1 the workpiece 12 is directed upwards, i.e. toward the observer. One can see in this way clamping elements 24 that are provided on the cradle plate 22 and that clamp between them the workpiece 12.

Between the supports 18, 19, there is further indicated a chip baffle 26 which will be described hereafter in more detail with reference to FIG. 2.

A mechanical translation system 28 for the tool spindle 14 is provided below the workpiece table 11; the geometric relationships of that arrangement will be better understood from the discussion below, with reference to FIG. 2.

The mechanical translation system 28 comprises two lever mechanisms 29, 31, mounted for vertical displacement on the machine frame 17 via guides 32, 33 and carriages 34, 35.

The lever mechanisms 29, 31 are mounted, via joints 36, 37, on the machine frame 18 so as to pivot about a horizontal axis. To this end, the lever mechanisms 29, 31 each comprise a first plate 38, 39 mounted on the carriage 34 or 35, respectively, for pivotal movement as indicated by arrow 41 or 42, respectively. On their other ends, the plates 38, 39 are connected with joints 43, 44 on which second plates 45, 46 of the lever mechanisms 29, 31 are pivoted as well. The second plates 45, 46 have their other ends connected with the tool spindle 14.

The first and second plates 38, 45 and 39, 46, respectively, can be pivoted one relative to the other, as indicated by arrows 47, 48, respectively. The second plates 45, 46 are further articulated on the tool spindle 14, as indicated by arrow 49.

The two lever mechanisms 29, 31 and the plates 38, 39, 45, 46 form together a very stiff mechanical translation system 28 for the tool spindle 14 which in addition cannot tilt or become canted. By pivoting the plates 38, 39, 45, 46 appropriately about the joints 36, 37, 43, 44 the tool spindle 14 can be displaced in horizontal direction and brought below any desired point of the cradle plate 22. And when the tool 16 is displaced along the guides 32, 33 it can penetrate from below into the workpiece 12 for performing drilling and milling operations, for example.

In the illustration of FIG. 1 the machine tool further comprises on its front a tool magazine 50 with storage positions 51 for tools 16 to be changed. By suitably adjusting the joints 36, 37, 43, 44, the tool spindle 14 can be caused to address any storage position 51 in the tool magazine 50 in order to deposit a previously used tool 16 and to pick up a new tool 16.

For filling the tool magazine 50 with tools, a door 52 is provided through which the operators can empty the storage positions 51 and mount new tools.

An additional door 53 is provided on the opposite side of the machine tool 10 for removing a finished workpiece 10 and for mounting a workpiece 12 to be machined.

During the described removal, the cradle plate 22 occupies the position indicated in FIG. 1. For machining the workpiece 12, the cradle plate 22 is then pivoted by 180° about the axis 23 so that it then occupies the position illustrated in FIG. 2, in which the workpiece 12 is directed downwards toward the tool spindle 14.

Figure 2:
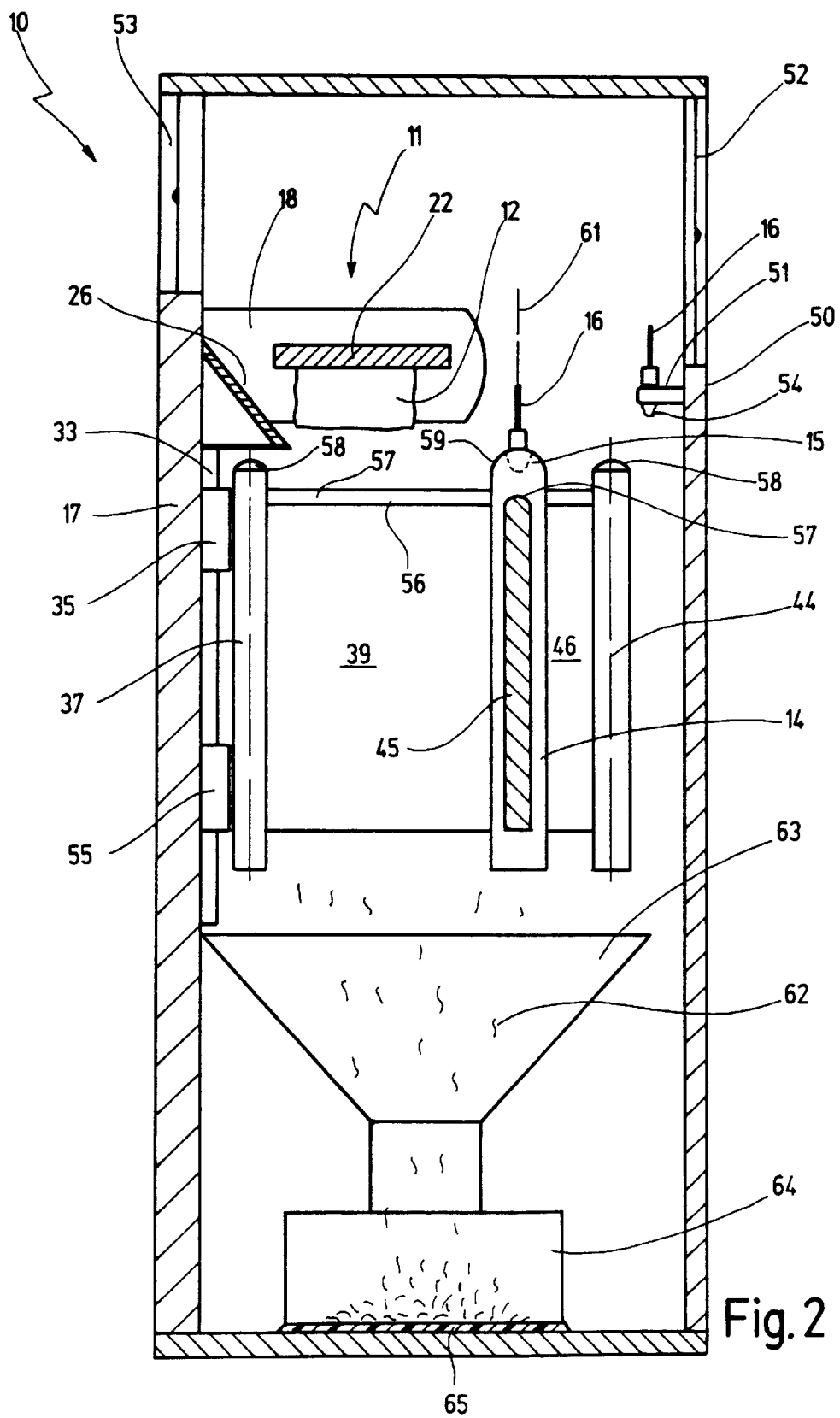
FIG. 2 shows a sectioned side view of the novel machine tool, taken along line II—II in FIG. 1.

As can be seen in the right-hand upper portion of FIG. 2, the storage position 51 of the tool magazine 50 holds a tool 16, pointing upwards, whose other end is equipped with a usual steep-angle taper or hollow-shank taper 54.

On the opposite wall of the machine frame 17, there can be seen the guide 33 with the upper carriage 35 on which the joint 37 is fixed in a suitable way. Further below, a second carriage 55 is carried on the guide 33, through which tilting of the entire mechanical translation system 28 is prevented.

Above the guide 33, the chip baffle 26 is now better visible, extending in FIG. 2 obliquely in downward direction and to the right, and providing in this way an effective guard against chips that arise during machining of the workpiece 12 and that leap to the side and to the bottom. So, the chip baffle 26 protects the guides 32, 33 and the carriages 34, 35, 55 running thereon from falling chips and corresponding damage or heating up.

The plates 38, 39, 45, 46 exhibit on their upper narrow sides 56 chip-repellent surfaces 57 which in the simplest of all cases have a semi-circular cross-section, as can be clearly seen in the top portion of the sectional view of the plate 45. The joints 36, 37, 43, 44 are covered by caps 58 so that the vertical surfaces of the joints are protected from chips. The tool spindle 14 is likewise rounded at its upper end 59 in order to prevent chips from depositing.

In operation, i.e. when the tool spindle 14 turns the tool 16 about its spindle axis 61 and machines the workpiece 12 in "overhead" mode from below, chips 62 are produced which are directed into a chip pan 64 via a chip-collector funnel 63.

The machine tool 10 is provided for dry machining or machining with minimum-quantity lubrication and uses so little coolant that the chips 62 are neither wetted with, nor cooled by the coolant. The produced hot chips 62 are directed to the bottom in FIG. 2 by the chip baffle 26, the chip-repellent surfaces 57 and the caps 58 and are in this way effectively prevented from settling on the joints 36, 37, 43, 44 or the plates 38, 39, 45, 46 or even on the guides 32, 33.

To say it in other words, the produced hot chips 62 are immediately directed into the chip pan 64 via the chip-collector funnel 63. As the chips are not wetted with coolant, they cannot possibly adhere and stick to the substantially vertical surfaces of the plates 38, 39, 45, 46 and of the joints 36, 37, 43, 44 and the tool spindle 14.

All hot chips 62 are collected in the chip pan 64, which is protected from heating-up by an insulation 65.

We claim:

1. A machine tool having a workpiece table comprising:
   a device that fixes workpieces underneath the workpiece table at least when the workpieces are machined; and
   a tool spindle with a fixture for holding tools used for machining the workpieces, wherein the tool spindle is seated on a mechanical translation system which is arranged, at least in part, below the workpiece table, such that the tool-holding fixture is pointing upwards, at least when in an operating condition;

wherein the workpiece table comprises two horizontal supports running parallel to each other, on which supports the device is arranged for pivotal movement about a horizontal axis.

2. The machine tool as in claim 1, wherein a chip baffle, extending obliquely in downward and forward direction, is arranged between the supports.

3. A machine tool having a workpiece table for fixing workpieces to be machined, wherein the workpiece table comprises a device being accessible from below for fixing the workpiece and two horizontal supports running parallel to each other, on which supports the device is arranged for pivotal movement about a horizontal axis, the machine tool further having a tool spindle with a fixture for holding tools used for machining the workpieces, wherein the tool is an overhead tool pointing upwards, at least when in an operating condition.

4. The machine tool as in claim 3, wherein the tool spindle is seated on a mechanical translation system which is arranged, at least in part, below the workpiece table, such that the tool-holding fixture is pointing upwards.

5. The machine tool as in claim 4, wherein the mechanical translation system comprises at least one lever mechanism mounted on a machine frame of the machine tool so that it can pivot about a vertical axis formed by a joint.

6. The machine tool as in claim 5, wherein the lever mechanism comprises two vertically oriented plates that are mounted pivotably one relative to the other about a joint, one of the plates being connected with the tool spindle, the other one being connected with the machine frame.

7. The machine tool as in claim 5, wherein the joints are provided with caps to protect them from chips.

8. The machine tool as in claim 6, wherein the plates comprise chip-repellent surfaces on their upper narrow sides.

9. The machine tool as in claim 5, wherein two lever mechanisms are provided.

10. The machine tool as in claim 3, wherein a chip baffle, extending obliquely in downward and forward direction, is arranged between the supports.

11. The machine tool as in claim 4, wherein a chip collector funnel is arranged below the mechanical translation system for transferring any chips encountered into a chip pan.

12. The machine tool as in claim 3, wherein a tool magazine with storage positions for tools is arranged on the machine frame and the different storage positions can be directly addressed by the tool spindle for tool changes.

* * * * *